(12) United States Patent
Liu

(10) Patent No.: US 6,948,756 B2
(45) Date of Patent: Sep. 27, 2005

(54) SAFETY SEAT IN A MOTOR VEHICLE

(76) Inventor: Xi Liu, Electrical Apparatus Central Factory of Normal University, #5 Subzone, Gaoxin Area, Guilin City, Guangxi Province (CN), 14004

( * ) Notice: Subject to any disclaimer, the term of this patent is extended or adjusted under 35 U.S.C. 154(b) by 0 days.

(21) Appl. No.: 10/613,480

(22) Filed: Jul. 3, 2003

(65) Prior Publication Data

US 2004/0113452 A1 Jun. 17, 2004

(51) Int. Cl.[7] ............................................. B60N 2/04
(52) U.S. Cl. .................................. 296/68.1; 297/216.16
(58) Field of Search ........................ 296/68.1; 297/216, 297/216.16

(56) References Cited

U.S. PATENT DOCUMENTS

| | | | | |
|---|---|---|---|---|
| 3,022,976 A | * | 2/1962 | Zia | 248/430 |
| 5,167,421 A | * | 12/1992 | Yunzhao | 297/216.18 |
| 5,344,204 A | | 9/1994 | Liu | |
| 5,626,203 A | * | 5/1997 | Habib | 180/274 |
| 6,170,865 B1 | * | 1/2001 | Barron | 280/735 |
| 6,224,131 B1 | * | 5/2001 | Shammout | 296/68.1 |
| 6,227,563 B1 | * | 5/2001 | Talisman | 280/735 |

FOREIGN PATENT DOCUMENTS

| | | | |
|---|---|---|---|
| CN | 96112075.4 | 5/1997 | |
| WO | PCT/DE94/00353 | * 10/1994 | ............ 297/216.18 |

* cited by examiner

Primary Examiner—Dennis H. Pedder
(74) Attorney, Agent, or Firm—Milde & Hoffberg, LLP

(57) ABSTRACT

This invention provides an anti-crash safety seat in a motor vehicle, in which a backrest and so on are provided on a moveable bracket that can move backwards. A front shaft with bearings, a back shaft with bearings, and a seat control system for controlling the seat by making use of the inertia force and electromagnetic force are provided on the moveable bracket. The moveable bracket is mounted on a fixed frame by the bearings, shafts and nuts. The fixed frame is fixed on a floor of a cab of the motor vehicle and has an energy-absorbing plate, energy-absorbing bearings and two rails parallel each other thereon. When the motor vehicle collides, the energy-absorbing components in the seat absorb and transform the kinetic energy of the seat. The seat control system is actuated by a switch, so as to release the seat from being locked. Under the elastic force of the safety belt and so on, a driver and/or a passenger and the seat can move backwards to the safety zone together, achieving the goal of protecting the driver and/or passenger from being crushed.

20 Claims, 10 Drawing Sheets

SAFETY SEAT IN A MOTOR VEHICLE

FIELD OF THE INVENTION

The present invention relates to a seat in a motor vehicle, and particularly to an anti-crash safety seat in a motor vehicle, which prevents a driver and/or a passenger front seat from being injured in the event of a collision.

BACKGROUND OF THE INVENTION

At the present, there are many methods to protect a driver and/or a passenger in the front seat in the event of a collision of a motor vehicle. Renault of France makes honeycomb style bumpers to absorb energy. Typically, safety belts and air bags are provided in the motor vehicle. If the safety devices for the motor vehicle were perfect, the drivers and/or passengers should suffer little or even no injuries during a collision. However, based on the statistical data, in every three minutes, one person loses his life during a collision of a motor vehicle throughout the world. This proves that there are defects in the safety devices for motor vehicles. After careful study, it has been found that the following are the main reasons for the casualties of the drivers and/or passengers: 1. The drivers and/or passengers are injured directly by a crush of a deformed steering wheel, a deformed instrument panel and/or the deformed cab; and 2. The injured cannot be carried out of the cab, so the rescue time is unnecessarily long.

The U.S. Pat. No. 5,344,204A issued to inventor, Liu Yunzhao, discloses a novel safety seat for a driver. When the motor vehicle collides, the seat and the driver can move backward together to avoid or reduce the injury to the driver caused by a crush of a steering wheel, a deformed instrument panel and so on. This U.S. patent is incorporated herein by reference.

The Chinese patent application 96102201.9 filed on Jan. 22, 1996 and entitled "Safety Seat in the Front of a Motor Vehicle" and the Chinese patent application 96112075.4 filed on Nov. 5, 1996 and entitled "Multifunctional Safety Seat in the Front of a Motor Vehicle" disclose improvements to the above US patent. Each of the above-mentioned documents are hereby incorporated by reference.

After making a 130,000 km road test and a real car collision, the following defects were determined in the above-mentioned safe seat in the front of the motor vehicle: First, the ability of the small bearings that can endure the pressure radially is small and the outer rings often break; however, conventional roller bearings that can endure high pressure cannot be adapted to the cars, because its inner and outer rings have too large diameters and they cause the seat to have too large a bulk and a too heavy weight. Second, when the test car ran to more than 30,000 km, the rails of the seat accumulated dust, oil stains and rust, so that the bearings could not move in the rails whose height was 0.03–0.08 mm normalized tolerance over the bearings. Third, because the reinforcing support could not rotate when the motor vehicle collided at a high speed, the reinforcing support was locked by the regulate plate, and the rails of the seat and the front shaft deform, so the lock pin for locking the seat could not be released. Fourth, when such a seat is mounted in a car, the rails inconvenience the passengers in the back sweats.

SUMMARY OF THE INVENTION

One of the objects of the invention is to overcome the defects of the prior art and provide a kind of anti-crash safe seat in a motor vehicle, in which a driver and/or a passenger can move backward more securely when the motor vehicle collides.

This object, as well as other objects which will become apparent from the discussion that follows are achieved, in accordance with the present invention, by providing a mount for an anti-crash front safety seat for a motor vehicle having a cab for occupants, in which the mount comprises the following elements:

a fixed frame fixedly connected to a floor of the cab of the motor vehicle, said fixed frame having at least two elongate rails, the longitudinal direction of the rails of the fixed frame being the same as that of the motor vehicle;

a movable bracket supported movably on the rails of the fixed frame, said bracket being mounted below and adapted to be attached to the seat and backrest;

a front shaft and a back shaft passing through shaft holes in said bracket and positioned in the rails of the fixed frame;

a brake assembly, fixedly connected to at least one of the floor of the cab and said fixed frame, for applying a braking force to said back shaft to inhibit movement thereof; and a seat control system for locking said bracket to the fixed frame, so as to lock the seat and backrest in position during normal driving of the motor vehicle, and for releasing said bracket, and in turn the seat and backrest, for rearward movement in the event of a crash of the motor vehicle.

When the motor vehicle incorporating the anti-crash front safety seat according to the invention collides with another object, the seat will have a tendency to move forward due to inertia. At first, the kinetic energy of motion will be absorbed or transformed into elastic potential energy (elastic deform energy) of a metal stock plate and a front buffer band on the seat mount. Then, as the speed of the motor vehicle is rapidly reduced, the forward inertia force of the seat becomes smaller too and the pressure applied to the metal stop plate and the buffer band is reduced. Eventually, the elastic potential energy of the metal stop plate and the buffer band will produce a rearward force that exceeds the forward force of inertia and the seat will begin to move backward. In addition, if the motor vehicle is equipped with an airbag, the force of the airbag against the person seated in the safety seat will also assist in the backward movement of the seat. When this occurs, the brake assembly will inhibit the rapid rearward movement of the seat.

More particularly, the present invention concerns an anti-crash safety seat in a motor vehicle which includes a backrest, a device that regulates a comfortable driving (or comfortable riding) distance between a seat and a steering wheel and distance between a driver and an instrument panel, and a safety belt. The seat further comprises a fixed frame fixedly connected to a floor of a cab of the motor vehicle, the longitudinal direction of the fixed frame being the same to that of the motor vehicle, wherein the fixed frame comprises a front energy-absorbing buffer band, an energy-absorbing plate provided on the top surface thereof, energy-absorbing bearings provided on the front end thereof, a pin hole provided in one front side thereof, two rails parallel each other formed in both sides thereof without a closing plate on the back end thereof, an iron plate for limiting the distance the seat can displace backward and for reinforcing the fixed frame, an energy-absorbing device provided on the back part of the fixed frame, a movable bracket provided movably on the fixed frame, the backrest mounted above the movable bracket, wherein the top surface of the movable bracket is supported on the energy-absorbing bearings, a metal sleeve for positioning the lock pin being provided on the front side thereof in the position corresponding to said pin hole, as well as front and back shaft holes spaced with each other provided in both sides thereof in the positions corresponding to the two rails of the fixed frame, a front shaft and a back shaft passing through the shaft holes in the movable bracket and positioned in the rails of the fixed frame, inner bearings of the front shaft provided on the front shaft for contacting the upper surface of the rails, and two inner bearings of the back shaft provided on the back shaft which are supported by the lower surface of the rails, and a seat control system provided on the front part on one outside of the movable bracket, the control system locking the movable bracket having the backrest to the fixed frame by the lock pin passing through the metal sleeve and pin hole, so as to lock the seat, and releasing the seat by taking the lock pin out of the pin hole.

The seat control system according to the present invention further comprises an electromagnetic controller whose axial orientation is the same as the longitudinal direction of the motor vehicle, a manually operated control hammer and a metal block for controlling the pin lock. A moveable armature is provided in the electromagnetic controller. One end in the axial direction of the movable armature that is sheathed by a reset spring is connected to the manually operated control hammer, the other end in the axial direction thereof is connected to one end of the metal block, and the other end thereof has a notch. One big end of the lock pin inserted into the pin hole and metal sleeve is sheathed by a reset spring, and the other small end thereof has a flange for supporting the reset spring. In the condition that the seat is locked, the small end of the lock pin is supported by one side (no bearings are provided thereon) of the metal block, the tip end of the big end of the lock pin that has a smaller diameter is pressed into the pin hole in one side of the fixed frame by the effects of the bearing whose one side is positioned opposed to the side of the metal block and the housing wall of the control system. In the condition that the seat is released, the metal block for controlling the lock pin moves along the longitudinal direction of the motor vehicle relative to the lock pin under the effect of the electromagnetic controller and the inertia of the manually operated control hammer and of the metal block, or under the effect of the manually operated control hammer directly, until the small end of the lock pin enters into the notch in the other end of the metal block, and at the time the lock pin is moved out from the pin hole by the reset spring.

Preferably, a step is provided on the big end of the lock pin for preventing a jam in the metal sleeve for positioning the lock pin and the pin hole.

Preferably, the metal sleeve for mounting the lock pin is a combination of two coaxial steel pipes with different inner diameters. Due to the technical requirement, the maximum value of the length of the portion of the metal sleeve that is embedded in the front side of the moveable bracket is equal to the thickness of the side of the moveable bracket; the length of the portion of the metal sleeve that has a small diameter is larger than the thickness of the side of the moveable bracket, and the diameter of the portion is slightly larger than that of the lock pin, while it is smaller than that of the reset spring sheathing on the lock pin. The length of the portion of the metal sleeve that has a big diameter is smaller than the that of the portion having a small diameter. The diameter of the portion of the metal sleeve that has a big diameter is larger than the outer diameter of the reset spring sheathing on the lock pin, and the reset spring for the lock pin is provided in the portion of the metal sleeve that has a big diameter and abuts against the step wall located at the intersection of the portions.

Preferably, the back shaft further comprises two outer energy-absorbing bearings provided outside of the rails, the energy-absorbing device comprises energy-absorbing racks provided on both sides of the moveable bracket and energy-absorbing rods in contact with the top portion of the energy-absorbing bearings of the back shaft, forming a brake assembly.

Preferably, the outer energy-absorbing bearings of the back shaft can be big bearings that can endure high pressure, the rest of the energy-absorbing bearings are compression resistant, small roller bearings, in which the materials of the inner and outer rings of the small roller bearings are different from those of the conventional ones. The width of the outer ring of the roller bearings is wider than that of the conventional one, the length of the roller bearings is longer than that of the conventional one, the maximum value of the width of the outer ring of the roller bearings is 1.5 times of that of the conventional one, the maximum value of the length of the outer ring of the roller bearings is 1.5 times of that of the conventional one, and the width of the inner rings is larger than that of the outer rings.

Preferably, a middle hole is further provided between the hole for the front shaft and the one for the back shaft on both sides of the moveable bracket, and a middle shaft with two bearings is provided in the rails of the fixed frame by passing through said middle holes in order to keep the front and middle shafts in the rails after the back shaft is moved out from the rails.

Preferably, a closing plate is provided on the back end of the two rails in the fixed frame to protect the back shaft from being moved out from the rails.

Preferably, the outer diameter of the outer energy-absorbing bearings of the back shaft is larger than that of the coaxial inner bearings.

Preferably, the energy-absorbing device on the back part of the moveable bracket comprises energy-absorbing racks on both sides of the moveable bracket, one energy-absorbing plate positioned on the top surface on the back part of the moveable bracket and energy-absorbing rods for connecting the energy-absorbing plate to both sides of the energy-absorbing racks, in which the hardness of the moveable bracket is stronger than that of the energy-absorbing plate.

Preferably, the lock pin has a substantially square shape, and the length of any one of its edges is longer than the diameter of the big end.

Preferably, the difference between the height of the two rails parallel each other in the moveable bracket and the diameter of the outer ring of the inner bearings for the front or the back shaft moving in the rails is larger than the normalized value that is required by normal mechanical movement, and the maximum value of the difference is 10 mm.

Preferably, the energy-absorbing rack consists of a thin channel section steel and cover plate fixed on one end thereof, and one end of the cover plate has a notch for the movement of the energy-absorbing rod.

Preferably, in the seat control system, the metal block for controlling the lock pin becomes the metal block by increasing its weight, the end of the metal block has a notch for the movement of the small end of the lock pin along the longitudinal direction and the manually operated control hammer becomes the manually operated control hammer by increasing its weight. A spring is provided additionally for resetting the metal block to its original position; a handle of the manually operated control hammer with an increased weight after being sheathed and the spring for resetting the metal block to its original position is connected to one end of the metal block without the notch for controlling the lock pin with an increased weight along the longitudinal direction. When mounted, the longitudinal direction of the metal block with the manually operated control hammer is the same longitudinal direction, i.e., the direction of the front of the motor vehicle, so the electromagnetic controller is not necessary.

The process of operation of the anti-crash safe seat in a motor vehicle according to the present invention is as follows: The side plates having pin holes with a filleted rectangular cross-section, the energy-absorbing plates provided along the horizontal direction, the front metal energy-absorbing stop plate, the energy-absorbing racks provided in the back part, and the two rails parallel each other are mounted in the fixed frame of the seat. The fixed frame is fixed on the floor of the cab of the motor vehicle. The longitudinal direction of the floor is the same as that of the motor vehicle.

The seat control system, the metal sleeve for positioning the lock pin, the front shaft with bearings, the back shaft with bearings and the backrest and so on are provided on the moveable bracket of the seat. The moveable bracket is provided in the two rails parallel each other in the fixed frame by shafts and nuts.

The big end of the lock pin is inserted into the pin hole with a filleted rectangular cross-section in the fixed frame from the metal sleeve on the moveable bracket. Under the effects of the reset spring of the moveable armature, the metal block that is integrally connected to the manually operated control hammer and movable armature lock the lock pin to lock the seat. When the motor vehicle collides, the kinetic energy of the original seat may destroy the rails so badlythat the energy must be absorbed. As is well known from the law of conservation of energy, the front metal energy-absorbing stop plate of the fixed frame and the buffer band provided between the stop plate and the moveable bracket can absorb a part of the kinetic energy of the seat and transform a part of the kinetic energy into the elastic potential energy.

Under normal conditions, the lower surface of the front part of the moveable bracket is pressed directly in the energy-absorbing bearings (the inner bearings for the front shaft does not contact with the lower rail portions, while contacting with the upper rail portions) above the energy-absorbing plate of the fixed frame, and the outer energy-absorbing bearings for the back shaft is also pressed by the energy-absorbing rods of the back energy-absorbing rack, so the stability of the seat is guaranteed. As a result, the bearings under the load comprising: the inner bearings for the back shaft that contacts with the lower rail surface and the energy-absorbing bearings above the energy-absorbing plate on the fixed frame.

When the motor vehicle is collided, owing to the effects of the backrest and so on, the back part of the movable bracket is subjected to a force inclined upwards and the front part thereof is subjected to a force inclined downwards. The components under the force in the back are: the outer energy-absorbing bearings for the back shaft, the back energy-absorbing racks on both sides of the fixed frame and the energy-absorbing rods on the racks. The components under the force in the front are: the metal stop plate on the front end of the fixed frame, the upper energy-absorbing plate, the energy-absorbing bearings on the plate and the front portion of the moveable bracket. Because the moveable bracket is harder than the energy-absorbing plate of the fixed frame, the energy-absorbing plate and so on will deform, in order to absorb some kinetic energy of the seat and transform a part of the kinetic energy into the elastic potential energy of the energy-absorbing plate and the metal stop plate on the front end of the fixed frame. At this time, the bearings on the front shaft is away from the upper rail portion and contact with the lower rail portion. In the similar way, the back energy-absorbing racks on both sides of the fixed frame and so on deform slightly under the effects of the energy-absorbing rods and absorb the energy.

When the motor vehicle collides with a certain strength, the automatic contactor mounted on the motor vehicle is actuated, and the electromagnetic controller of the seat control system is turned on. Due to the inertia, the seat will rush ahead, and the lock pin will move forward slightly to depart off the fixed back wall of a filleted rectangular pin hole following the moveable bracket. However, any edge of the cross-section of the pin hole is larger than the diameter of the lock pin, so the lock pin does not contact with the pin hole again. As a result, the seat cannot apply an inertia force to the lock pin. The movable armature is effected by an electromagnetic force F whose direction is the same as the direction of the movement of the motor vehicle before the collision (because the axial direction of the electromagnetic controller is the same as the longitudinal direction of the motor vehicle), because there is current flowing through the coil of the electromagnetic controller. In addition, because the manually operated control hammer, the moveable armature and the metal block for controlling the lock pin are integrally connected together, they will be affected by a large inertia force F' whose direction is the same as the direction of the movement of the motor vehicle before the collision (that is, the direction of the electromagnetic force F). Under the two forces that have the same direction, the metal block and so on moves along the axial direction of the electromagnetic controller. When the metal block moves to such a position that the notch for the movement of the small end of the lock pin is aligned with the small end of the lock pin, the lock pin will move outward under the effect of the spring and release the seat.

In addition, when the motor vehicle collides, a driver and/or a passenger will move forward and stop due to the effect of the safety belt. Also, it is known from the law of conservation of energy that the safety belt, the portion where the driver and/or the passenger contacts with the safety belt, and some similar portions cause a certain deformation and absorb energy, and a part of the kinetic energy of the driver and/or the passenger is transformed into the elastic potential energy of the safety belt and so on. When the inertia force reduces to a certain degree, the driver and/or the passenger will be pushed backward under the effect of the elastic force of the safety belt; that is, the elastic potential energy of the safety belt is transformed into the kinetic energy of the driver and/or the passenger. In a similar way, the seat will move backward under the effect of the elastic force of the front energy-absorbing metal stop plate. As a result, the speed of the driver and/or the passenger is close to that of the seat so that the driver and/or the passenger still sit on the seat. In the end, the aim of protecting the driver and/or passenger from being crushed is achieved.

Compared to the prior art, the present invention has the following substantive features and improvements:

1. Comparative to the prior art, the present invention is further designed to have a buffer band, a horizontal energy-absorbing plate (relatively thin iron plate), energy-absorbing bearings, a energy-absorbing rack, energy-absorbing rods, energy-absorbing bearings mounted on the outside of the back shaft. When the motor vehicle is collided, the above-mentioned components and other small fittings deform, absorb and transform most kinetic energy of the seat. So the key components, such as rails, a moveable bracket, bearings for shafts, bearings in the rails and so on can be protected.

2. Conventional bearings are adopted in the prior art, and outer rings and inner rings for such bearings are easy to break. However, novel compression resistant, and special small roller bearings are adopted in the present invention, in which not only the materials of the inner and outer rings are different from those of the conventional ones, but also the width thereof are different (the width of the roller bearings is wider than that of conventional ones when they have the same outer diameters), and the length of the roller of the roller bearings is increased, and the width of the inner ring is larger than that of the outer one. As a result, during the normal running of the motor vehicle, the bearings will not break. In addition, during a collision of the motor vehicle, the bearings will not break.

3. In the prior art, the axial direction of the electromagnetic controller is vertical to the longitudinal direction of the motor vehicle. When the motor vehicle collides at a high speed, the moveable armature will be subject to an increasing force of friction and be easily jammed. However, in the present invention, the axial direction of the electromagnetic controller is same as the longitudinal direction of the motor vehicle. The relatively large inertia force that causes breakage is changed into the drive force to turn on the switch. The drive force and the electromagnetic force that has the same direction ensures that the lock pin will be released by the metal block for controlling the lock pin to release the seat, when the motor vehicle collides severely. It is therefore observed in the present invention, that the relatively large inertia force that causes breakage is changed into the drive force to turn on the switch. Within the limit range of the speed of the motor vehicle, the higher the speed during the collision, the easier the locked seat is changed to a moveable seat. This is in contrast to the prior art.

4. In the prior art, the rails are easily impaired by the contamination of dust, oil stain and rust. However, in the present invention, because energy-absorbing components are further provided, and because the distance L between the height of the two rails and the outer diameter of outer bearing rings of the inner bearings for the shafts moving in the rails is larger than the normalized value that is required by normal mechanical movement, in which the maximum value of the distance L is about 10 mm (further because of the effects of the energy-absorbing components, the seat will not jump up and down), the seat rails according to the present invention will not be impaired by the contamination of dust, oil stain and rust.

5. According to the present invention, the lock pin is controlled by using the inertia force and electromagnetic force, and the current required is considerably smaller than the prior art. When the speed of the motor vehicle is very high during the collision and strong current cannot be supplied to the electromagnetic controller because the storage battery is broken or the capacitance of the storage battery becomes small, the seat also can be released by mainly using inertia according to the present invention. However, this feature cannot be achieved by the prior art.

6. In the prior art, the moveable armature is directly used as the lock pin. It has been proven by test that the electromagnetic controller has a force of only around 11 N, when the distance between the fixed armature and the moveable armature is 10 mm (because the safety cannot be guaranteed until the journey of the lock pin is beyond 10 mm). As a result, the seat cannot be released when the motor vehicle collides at high speed (the moveable armature will be subject to an increasing force of friction). However according to the present invention, a cylinder is used as the lock pin and the elastic force of the spring is used to draw off the lock pin. Its advantages are as follows: The elastic force of the spring is only dependent on the material, wire size and heat treatment of the spring, so the elastic force can easily be enhanced. When the volume factors are considered, the elastic force of the spring can be designed up to 1200 N. However, the elastic force of 160 N is enough in practice. Within the limit range of the speed of the motor vehicle, the elastic force of 160 N, designed according to the present invention, will be sufficient to draw off the lock pin and release the seat.

7. In the prior art, the seat is released by electromagnetic forces. However according to the present invention, the longitudinal direction of the metal block for controlling the lock pin is the same as the longitudinal direction of the motor vehicle, and when being mounted, the manually operated control hammer is provided on the front end of the metal block along the longitudinal direction (the direction of the front of the motor vehicle), and the notch for the movement of the small end of the lock pin is provided on the back end of the metal block. After the weight of the metal block and weight of the manually operated control hammer are increased, when the motor vehicle collides and the safety of the driver and/or passenger on the front seat is endangered, even though there is no electromagnetic controller, the seat can also be released by the inertia of the metal block and by the manually operated control hammer. However, this feature cannot be achieved by the prior art.

8. According to the present invention, an additional manually operated control hammer is designed for an emergency.

BRIEF DESCRIPTION OF THE DRAWINGS

FIG. 2A is a cross-sectional view taken along the line x—x of FIG. 2.

DETAILED DESCRIPTION OF THE PREFERRED EMBODIMENTS

Figure 1:
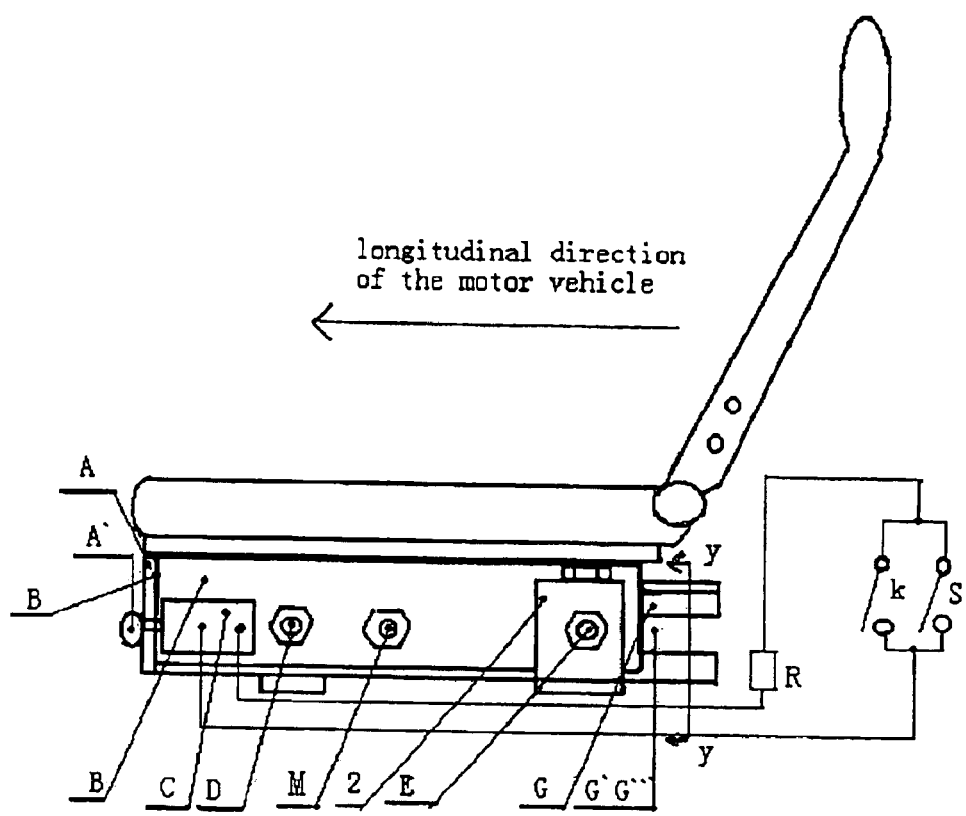
FIG. 1 is a side view and electrical schematic diagram of a first embodiment of an anti-crash safety seat for a motor vehicle according to the present invention, in which a device that regulates a comfortable driving distance between a driver and a steering wheel and a distance between a driver and an instrument panel in a normal state is removed.

The present invention will be described in more details with embodiments by referring to the accompanying drawings. Identical elements shown in the various figures are designated with the same reference numerals.

Figure 2:
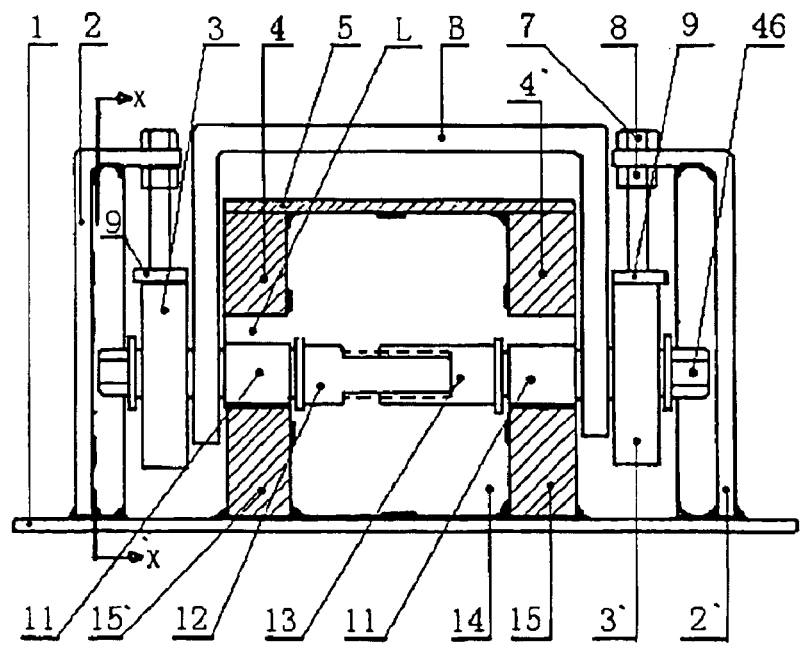
FIG. 2 is a cross-section along the line y—y of FIG. 1.
Figure 2:
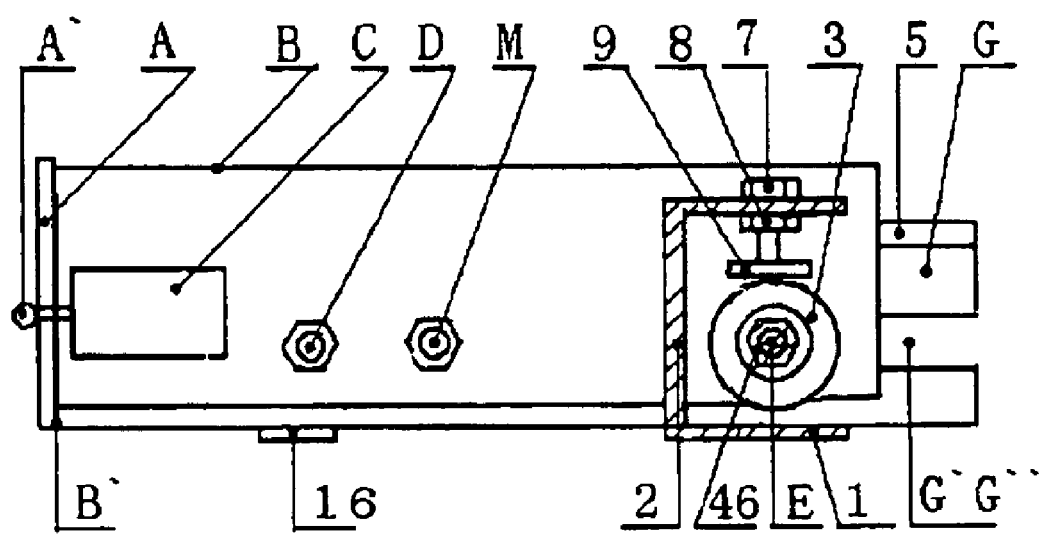
Figure 3:
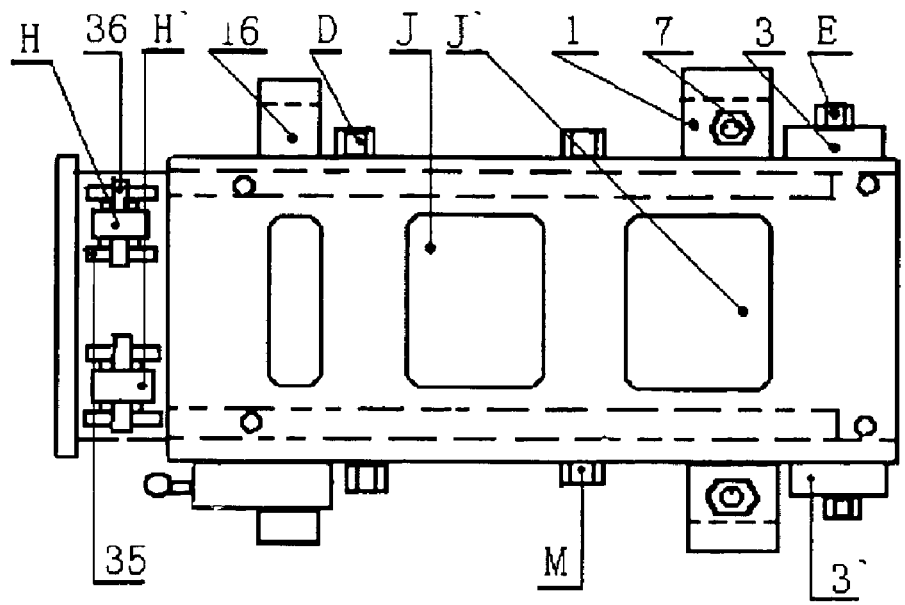
FIG. 3 is a top view of the first embodiment of the seat, in which the seat is in a partly opened condition.
Figure 4:
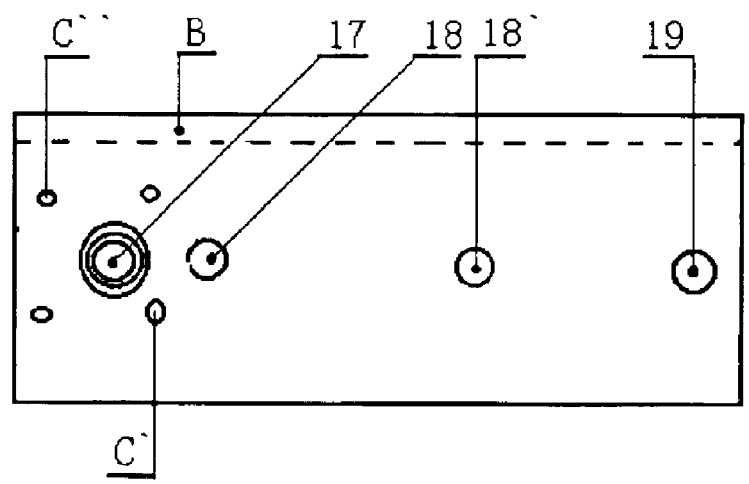
FIG. 4 is a view of a movable bracket of the first embodiment of the seat, in which a seat control system, a front shaft and a back shaft are removed.
Figure 5:
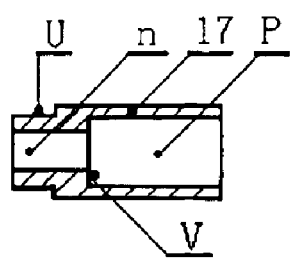
FIG. 5 is a cross-section of a metal sleeve for positioning a-lock pin along the central axis.
Figure 6:
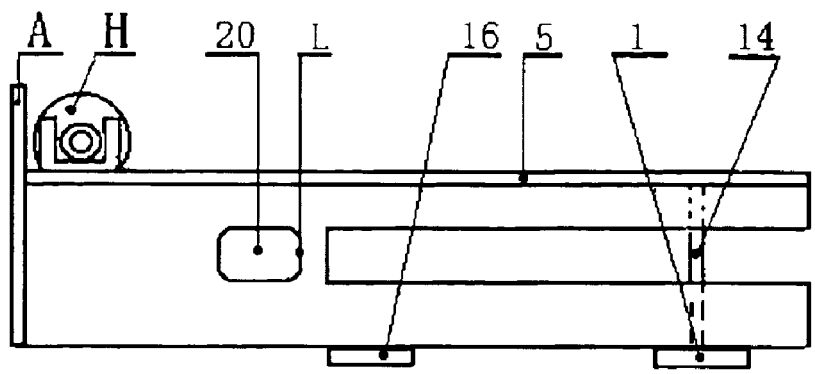
FIG. 6 is a view of a fixed frame of the first embodiment of the seat, on both sides of which energy-absorbing racks are removed.
Figure 7:
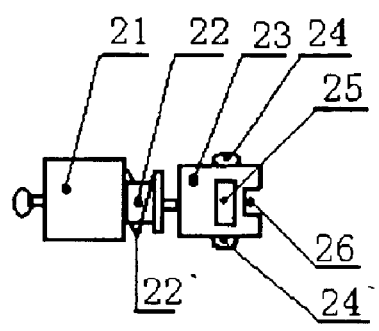
FIG. 7 is a front side view of the control system of the first embodiment of the seat, whose housing is removed.

The First Embodiment:

In the FIG. 1, and in all the other figures, a device that regulates a comfortable driving (or comfortable riding) distance between a seat and a steering wheel and a distance between a driver or rider and an instrument panel in a normal state are removed from an anti-crash safety seat in a motor vehicle in order to be seen more clearly. The anti-crash seat, shown in the FIG. 1–3, comprises a movable bracket B, which supports the seat and backrest, a fixed frame G and a seat control system C which is provided on one side of the movable bracket B. The movable bracket B, having a substantially C-shaped cross-section, is supported movably on the fixed frame G. Shown as FIGS. 2, 2A and 6, the fixed frame G on its back part has two parallel upper rail portions 4, 4' and two parallel lower rail portions 15, 15', so as to form two parallel rails G', G" (FIG. 1). The fixed frame G on its front part has a front metal energy-absorbing stop plate A and a front energy-absorbing buffer band B' and energy-absorbing bearings H, H'. The energy-absorbing bearings H, H' are fixed on the front portion of the energy-absorbing plate 5 of the fixed frame G. In addition, the fixed frame G on its bottom part comprises a front fixed plate 16 and a back fixed plate 1, an iron plate 14 for limiting the distance that the seat can displace backward and for reinforcing the fixed frame, as well as a pin hole 20 with a filleted rectangular cross-section L for locking the seat and back energy-absorbing racks 2 and 2' provided on both sides. The fixed frame G is screwed tightly on the floor of a cab of a motor vehicle via screws passing through the fixed plate plates 1 and 16. Energy-absorbing rods 9, 9' contacting the outer energy-absorbing bearings 3, 3' of the back shaft and nuts 7,8, for regulating the distance between the energy-absorbing rods and the energy-absorbing bearings of the back shaft, and therefore the brake pressure applied to the bearings 3, 3', are provided on the back energy-absorbing racks 2 and 2'. The rods 9, 9' and bearings 3, 3' therefore form an adjustable brake assembly for inhibiting movement of the back shaft.

As shown in FIGS. 1–9, screw holes C', C" for fixing the control system of the seat, a metal sleeve 17 for positioning the lock pin, a round hole 18 being passed through by the front shaft D, a round hole 18' being passed through by the middle shaft M and a round hole 19 being passed through by the back shaft E are provided on one side of the moveable bracket B which has a C-shaped cross-section. A step U for fixing the sleeve is provided on one end of the outside of metal sleeve 17 for positioning the lock pin, and the length of the step U is smaller than the thickness of the moveable bracket B. The step U is inserted into the one front side of the moveable bracket and is fixed thereto. The length of the portion n of the metal sleeve that has a small diameter is larger than the thickness of the side of the moveable bracket B. The diameter of the portion n is slightly larger than that of the big end of the lock pin 27, while it is smaller than that of the reset spring 28 sheathing on the lock pin. The length of the portion p of the metal sleeve that has a big diameter is smaller than that of the portion n having a small diameter. The diameter of the portion p of the metal sleeve that has a big diameter is larger than the outer diameter of the reset spring 28 sheathing on the lock pin. The reset spring for the lock pin is provided in the portion p of the metal sleeve that has a big diameter and abuts against the step wall V locating the intersection of the portions p,n. Pin openings J and J' are provided in the top side of the moveable bracket B for reducing the weight. Normally, the front shaft D, the middle shaft M and the back shaft E pass through the round holes 18, 18' and 19 in the moveable bracket B and are mounted in the two rails G' and G" paralleling each other in the fixed frame G by the bearings provided on the shafts. The distance L between the height of the two rails and the outer diameter of outer bearing rings of the inner bearings of the front, middle and back shaft provided in the rails is larger than the normalized value that is required by normal mechanical movement. The preferred length of the distance L is 10 mm.

Figure 10:
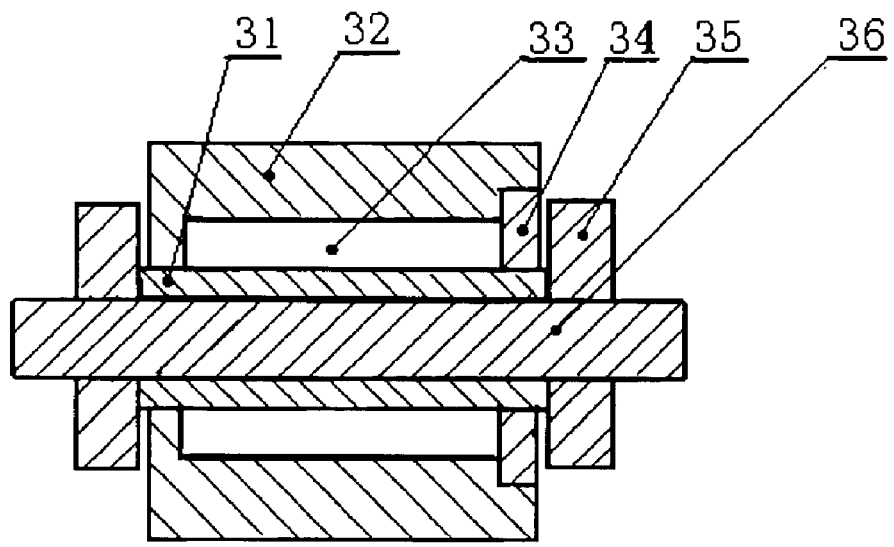
FIG. 10 is a sectional view of an energy-absorbing bearing, a bearing shaft and a bearing support on an upper energy-absorbing plate of the fixed frame in the energy-absorbing system of the first embodiment of the seat along the central axis.
Figure 11:
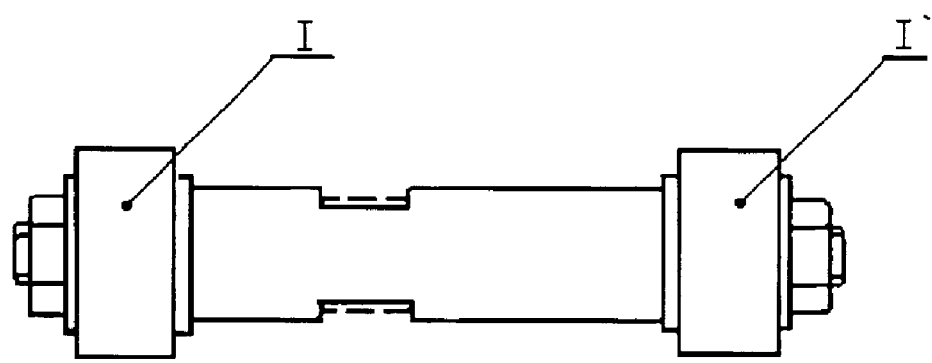
FIG. 11 is a view of the front shaft of the first embodiment of the seat, in which the front shaft is assembled with fittings.
Figure 12:
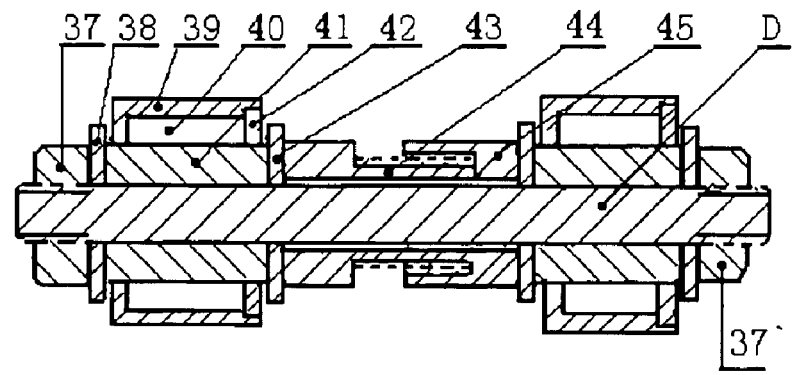
FIG. 12 is a sectional view of the front shaft of the first embodiment of the seat along the central axis, in which the front shaft is assembled with fittings (the structure of a middle shaft is the same as that of the front shaft).
Figure 13:
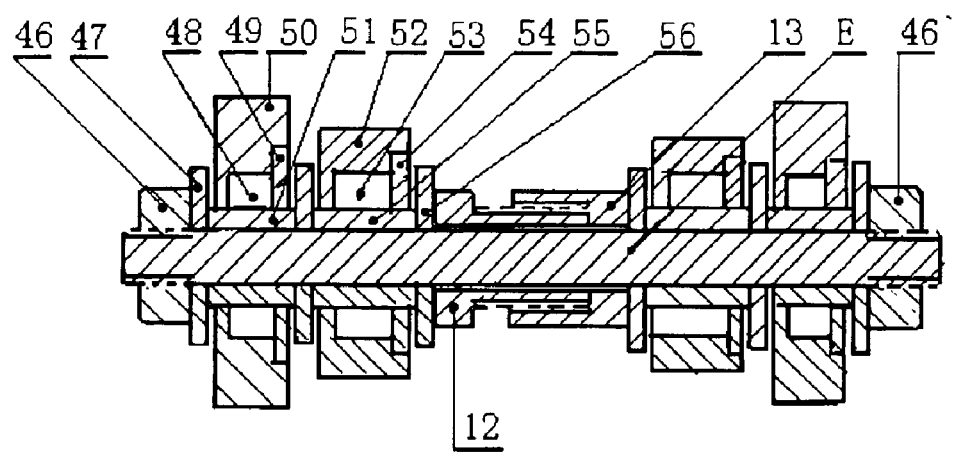
FIG. 13 is a sectional view of the rear shaft of the first embodiment of the seat along the central axis, in which the rear shaft is assembled with fittings.

FIG. 10 shows a structure of the energy-absorbing bearing H provided on the energy-absorbing plate 5, comprising an inner energy-absorbing bearing ring 31, the bearing outer ring 32, a bearing roller 33, a bearing roller sealing ring 34, energy-absorbing bearing support 35 and bearing shaft 36. The inner bearings I, I' on the front shaft, the inner bearings on the middle shaft and the inner bearings 11,11" on the back shaft have the same structures as the energy-absorbing bearing H. The materials of the inner and outer rings of energy-absorbing bearings according to the present invention are different from those of the prior art, and the width of the rings is greater. The inner rings are bigger than the outer ones, and the length of the rollers are lengthened. As shown in FIG. 11–12, the front shaft D on its both sides has two energy-absorbing bearings I, I' provided in the rails and contacting with the top portion of the rails. The two bearings comprise the inner bearing outer ring 39 of the front shaft, the inner bearing roller 40 of the front shaft, the inner bearing inner ring 40 of the front shaft, the sealing ring 42 of the inner bearing roller of the front shaft and the washer 38, 43 on the front shaft. Between the two bearings is an outer screw pipe 45 and an inner screw pipe 44 engaging with each other for regulating the front width of the movable bracket. The inner bearings of the front shaft on their outsides are fixed on the front shaft D by nut 37, 37'. As shown in FIG. 13, two inner bearings 11, 11" of the back shaft are provided on the back shaft E. The two inner bearings 11, 11" engage with the lower rail portions in the rails. The back shaft E on its both ends has outer energy-absorbing bearings 3, 3" provided on the outside of the moveable bracket B respectively. The structure of the outer energy-absorbing bearings of the back shaft comprises outer energy-absorbing bearing rollers 48, sealing rings 49 of the outer energy-absorbing bearings and the inner rings 51 of the outer energy-absorbing bearings. The structure of the inner bearings of the back shaft comprise outer rings 52 of the inner bearings of the back shaft, bearing rollers 53 of the back bearings, sealing rings 54 of the inner bearings of the back shaft and the inner rings 55 of the inner bearings of the back-shaft. In addition, back shaft washer 47, 56 are provided on the back shaft. The diameters of the outer energy-absorbing bearings are larger than those of the inner bearings of the back shaft, in which the outer energy-absorbing bearings and the inner bearings are on the same back shaft. In a similar way, an outer screw pipe 13 and an inner screw pipe 12 engaging with each other are also provided between the inner energy-absorbing bearings for regulating the back width of the movable bracket. The movable bracket B is supported on the fixed frame G by the back shaft E between the upper portion of the rails and the lower portion of the rails as well as the energy-absorbing bearings H, H'. The outer energy-absorbing bearings on their outsides are fixed on the back shaft E by nut 46, 46'. The movable bracket B is supported on the fixed frame G by the inner bearings 11, 11' of the back shaft E provided on the lower portion of the rails as well as the energy-absorbing bearings H, H'. The middle shaft M according to the present invention has the same structure and mounted position as those of the front shaft, so a detailed description thereof is omitted herein. For the above-mentioned energy-absorbing bearings and inner bearings, except that the outer energy-absorbing bearings of the back shaft can be big bearings, all the rest are compression resistant, special small roller bearings whose inner ring is wider than outer one, in which not only the materials of the inner and outer rings are different from those of the conventional ones, but also the width of the roller bearings are about 1.5 times of those of the conventional ones and the length of the rollers of the roller bearings are about 1.5 times of those of the conventional ones, when they have the same outer diameters.

Figure 8:
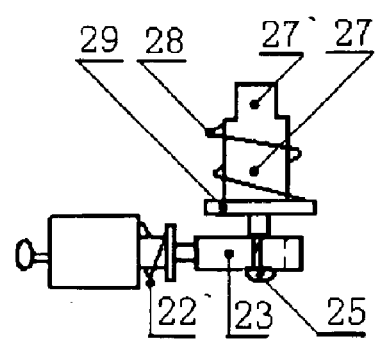
FIG. 8 is a top view of the control system of the first embodiment of the seat, whose housing is removed.
Figure 9:
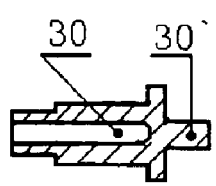
FIG. 9 is a sectional view of a lock pin of the first embodiment of the seat along a central axis, in which the lock pin is used to lock the seat.

A seat control system C is provided on the front part of the energy-absorbing seat and outside of the movable bracket B. As shown in FIGS. 1, 3 and 7–9, the seat control system C comprises: a control circuit including a fuse R, an automatic contactor K, a manually operated switch S and a motor battery W, an electromagnetic controller 21 whose axial orientation is the same as the longitudinal direction of the motor vehicle, a manually operated control hammer A', a pin lock 27 for locking the seat and a metal block 23 for controlling the lock pin. One end of the electromagnetic controller 21 is connected to the manually operated control hammer A', and the other end is connected to the metal block 23, so as to expose the movable armature 22 whose coil portion is sheathed by a reset spring 22'. The reset spring prevents the movable armature from retracting into the coil when the motor vehicle runs in a normal condition. Bearings 24, 24' and 25 are provided on the metal block 23. One end of the metal block 23 is connected to the movable armature 22 along the longitudinal direction, and the other end is provided with a notch 26 for receiving one end of the lock pin 27 when the lock pin is released. The lock pin 27 extends to the fixed frame G perpendicularly to the longitudinal direction of the motor vehicle. As shown in FIG. 8, in the locking condition, one small end 30' of the lock pin 27 is pressed by the bearing 25 on the metal block 23, and the other big end of the lock pin 27 is sheathed by the reset spring 28. A flange 29 for pressing the reset spring is provided on the location adjacent to the small end of the lock pin, and a step portion whose one top tip is reduced is provided on the other big end. As shown in FIG. 9, a round hole 30 is provided in the center of the big end of the lock pin for reducing the weight. In the locking condition, one side (on which there are no bearings) of the metal block 23 is abutted against the small end 30' of the lock pin 27 under the effects of the bearings 25 on the opposite side and the housing wall of the seat control system C to press the step portion 27' with reduced tip of the big end of the lock pin into the pin hole 20 of the fixed frame G.

Under normal conditions, after the big end of the lock pin 27 is inserted into the pin hole 20 of the fixed frame G from the metal sleeve 17 of the movable bracket B, the small end of the lock pin 27 is sustained against the bearing 25 on one side of the metal block 23 of the control system C, the metal block 23 is integrally connected to the manually operated control hammer A' and movable armature 22, to lock the fixed frame and the movable bracket, so that the seat cannot move along the longitudinal direction. At this time, a front surface of the movable bracket contacts with the buffer band B', and a lower surface is supported by the energy-absorbing bearings H, H' on the energy-absorbing plate 5 of the fixed frame. The front shaft D contacts with the upper rail portions 4, 4'. The lock pin 27 contacts with a back,wall L of the pin hole 20. The bearings of the middle shaft M are provided in the rails G, G'. The inner bearings 11, 11' of the back shaft are supported by the lower rail portions 15, 15'. The outside energy-absorbing bearings 3, 3" of the back shaft are pressed by the energy-absorbing rods 9, 9'. In this way, the seat according to present invention mounted on the movable bracket B is stopped from moving forward by the buffer band B' behind the stop plate A, and is stopped from moving backward by the lock pin 27 contacting with a back wall L of the pin hole 20, and is stopped from moving upward due to the fact that the bearings I, I' of the front shaft mounted on the front part of the movable bracket B is held by the upper rail portion 4, 4' positioned in the front and the outside energy-absorbing bearings 3, 3" of the back shaft are pressed by the energy-absorbing rods 9, 9' positioned in the back, and is stopped from moving backward due to the fact that the inner energy-absorbing bearings 11, 11' of the back shaft are supported by the energy-absorbing bearings H, H' on the front part of the movable bracket B and the lower rail portions 15, 15' in the back part of the movable bracket B. In such a way, the stability of the seat can be guaranteed.

When the motor vehicle collides with a certain strength, the automatic contactor mounted on the front end of the motor vehicle is actuated, the electromagnetic controller 21 of the seat control system is turned on, and the movable armature 22 is attracted by the coil magnetic field. In addition, the direction of the inertia movement of the movable armature, the manually operated control hammer A', the moveable armature 22 and the metal block 23 are same as the axial direction of the electromagnetic controller and same as that of the movement of the motor vehicle before the collision. As a result of the above-mentioned, the metal block 23 moves along the axial direction of the coil together with the movable armature 22. Simultaneously, the movable bracket B with the lock pin 27 passing through the metal sleeve 17 should move forward slightly; that is, the lock pin 27 moves away from the back wall L of the pin hole 20 in the fixed frame. The lock pin does not contact the pin hole 20 any longer since the edge of the pin hole 20, having a substantially square shape, is longer than the diameter of the lock pin. The inertia force of the seat cannot be applied on the lock pin 27, while it is applied on the metal stop plate A on the fixed frame G by the buffer band B'. When the metal block 23 moves to make the notch 26 align with the small end 30' of the lock pin, the small end 30' of the lock pin 27 moves outward quickly from the notch 26 under the force of the spring 28. After moving to a certain distance, the lock pin stops the movement since the Flange 29 is stopped by the notch 26 (because the diameter of the flange is larger than the width of the notch). At this time, the lock pin 27 is moved out from the pin hole 20 of the fixed frame, so that the movable bracket can move backward relative to the fixed frame. As a result, the seat on the movable bracket can be released. In a similar way, when the motor vehicle collides, due to the inertia, a pressure from the movable bracket B through the buffer band B' is applied on the metal stop plate A positioned on the front end of the fixed frame G for absorbing energy. At this time, the metal stop plate A is deformed and turns a part of the kinetic energy of the seat into the elastic potential energy of the stop plate.

When the motor vehicle operates normally, the bearings I, I' of the front shaft D contact with the upper rail portions 4, 4', and the energy-absorbing rods 9, 9' that are fixed on the cover plate F, F' (the cover plate F' not shown) of the energy-absorbing rack, respectively, by the nuts 7, 8, 7', 8' (nuts 7', 8' not shown) contact the outside energy-absorbing bearings 3, 3' of the back shaft. When the motor vehicle collides, due to the effects of the backrest and so on, the front part of the movable bracket B is subjected to a strong force inclined downward. However, due to the fact that the energy-absorbing bearings H, H' mounted on the energy-absorbing plate 5 of the fixed frame contact with the lower surface of the front part of the movable bracket B directly, the strong force inclined downward from the front part of the movable bracket is applied to the energy-absorbing bearings H, H' directly. Because the strength of the movable bracket is considerably greater than that of the energy-absorbing plate 5 provided with the energy-absorbing bearings H, H', the energy-absorbing plate 5 and so on undergo a certain deformation and absorb a part of the kinetic energy of the seat. At this time, the bearings I, I' of the front shaft are away from the upper rail portions 4, 4' and press against the lower rail portions 15, 15'.

In a similar way, when the motor vehicle collides, due to the effects of the backrest and so on, the back part of the movable bracket B is subjected to a force inclined upward. At this time, although the energy-absorbing bearings 3, 3' of the back shaft tend to move obliquely upward, because the energy-absorbing bearings are pressed by the energy-absorbing rods 9, 9' and the hardness of the back shaft E (made of the high-carbon steel and heat treated) of the seat is considerably stronger than those of the energy-absorbing racks 2, 2', the energy-absorbing racks 2, 2' and so on also undergo a certain deformation and absorb a part of the kinetic energy of the seat. During the above-mentioned process, the energy-absorbing bearings 11, 11' of the back shaft, which was under the load initially, is away from the lower rail portions 15, 15', so that the bearings are free of the force. It is obvious that during the collision the bearings I, I' of the front shaft, the bearings on the middle shaft and the inner bearings 11, 11' of the back shaft which move after the collision are protected by making use of the energy-absorbing device on the fixed frame. In addition, according to the surveys, it has been found that during the collision of the motor vehicle, the devices, such as the rails that are provided above the moveable bracket B and regulate a comfortable driving (or comfortable riding) distance between a driver and a steering wheel and a distance between a driver and an instrument panel in a normal state and the means for regulating the leaning of the backrest and so on causes a certain permanent deformation and loses the function of regulation. They also absorb some kinetic energy of the seat.

During the collision of the motor vehicle, one part of the kinetic energy is absorbed and one part of the kinetic energy is transformed into the elastic potential energy. At the same time, as the change of the speed of the motor vehicle that has collided becomes smaller and smaller, the inertia force of the seat becomes smaller and smaller also. The pressure that is applied on the metal stop plate A by the moveable bracket B through buffer band B' also becomes smaller gradually. However, the elastic force of the metal stop plate A is not like this. When the pressure that is applied to the metal stop plate A by the moveable bracket B through buffer band B' is smaller than the elastic force of the metal stop plate A, the moveable bracket B, the cushion and the backrest of the seat and so on begin to move backward under the effect of the elastic force of the metal stop plate A. As is known from the law of conservation of energy, the elastic potential energy of the metal stop plate A on the front part of the fixed frame is transformed into the kinetic energy of the seat, so the seat only can move backward at a certain speed (because the stop plate A is fixed). In a similar way, when the motor vehicle collides, a driver and/or a passenger move forward at a certain speed and stop when moving to a certain distance due to the effect of the safety belt. At this time, the safety belt, the portion where the driver and/or the passenger contacts with the safety belt, the fixed point of the safety belt and so on, also undergo a certain permanent deformation and absorb a part of the kinetic energy of the driver and/or the passenger. However, a considerable part of the kinetic energy of the driver and/or the passenger is transformed into the elastic potential energy of the safety belt, the fixed point of the safety belt, and so on. In a similar way, with the inertia force reducing gradually, a pressure that is applied to the safety belt by the driver and/or the passenger becomes smaller gradually. When the pressure is smaller than the elastic force of the safety belt, the driver and/or the passenger begins to move backward under the effect of the elastic force of the safety belt. As is known from the law of conservation of energy, the elastic potential energy of the safety belt is transformed into the kinetic energy of the driver and/or the passenger. At this time, the driver and/or the passenger only can move backward at a certain speed (because the safety belt is fixed). In the end, the driver and/or the passenger still sit on the seat.

It should be noted that, as long as the deformation of the motor vehicle during the collision still happens and the energy is absorbed, the inertia force of the driver and/or the passenger and the seat will not be zero. However, the pressures that are applied to the safety belt and the metal stop plate by the driver and/or the passenger and the seat, respectively, reduce to smaller than the elastic forces of the safety belt, and the metal stop plate, the driver and/or the passenger and the seat begin to move backward. Until now, the steering wheel and so on turn over to crush the driver and/or the passenger and the seat. The reasons are as follows: First, the kinetic energy of the motor vehicle during the collision is transformed into the energy (destroying energy) for destroying the front bumper of the motor vehicle and so on, and then, the kinetic energy develops further along the longitudinal direction; while there is a distance between the steering wheel as well as the instrument panel and the front bumper, there is also a distance between the driver and/or the passenger and the steering wheel as well as the instrument panel, therefore the time for the driver and/or the passenger and the seat to move backward will not be retarded due to these distances. As a result, the protection effect of anti-crash can be achieved. In addition, it has been proven by real collision tests, according to the present invention, before the driver and/or the passenger and the seat begin to move backward, the lock pin 27 is bounced out from the pin hole 20 by the force of the spring 28 and will not be retarded. Moreover, according to the present invention, the step portion whose one top tip is reduced is provided on the big end of the lock pin that is inserted into the pin hole 20, so the big end of the lock pin will not be jammed in the holes 20 and 17 because of deformation. As a result, the spring 28 is caused to bounce out the lock pin 27 reliably.

When the seat moves backward, and when the inner bearings 11, 11' of the back shaft is away from the lower rail portions 15, 15', due to the fact that the outer diameter of the outside energy-absorbing bearings 3, 3' of the back shaft is larger than that of the inner bearings 11, 11', the outside energy-absorbing bearings 3, 3' of the back shaft become to be the bearings sustaining the load for the back shaft. These two outside energy-absorbing bearings with large outer diameter that can bear high pressure can move backward on the floor of the cab of the motor vehicle, so the purpose of anti-crash can be achieved.

When the back shaft E leaves the rails and moves backward on the floor of the cab of the motor vehicle the front shaft D and the middle shaft M move in the rails and play the role of holding the movable bracket and seat in the fixed frame. As a result, the stability of the seat can be ensured in the event that the motor vehicle rolls over (the function of protecting the seat from rebounding to and fro belongs to the prior art, so the detailed description is omitted).

Figure 14:
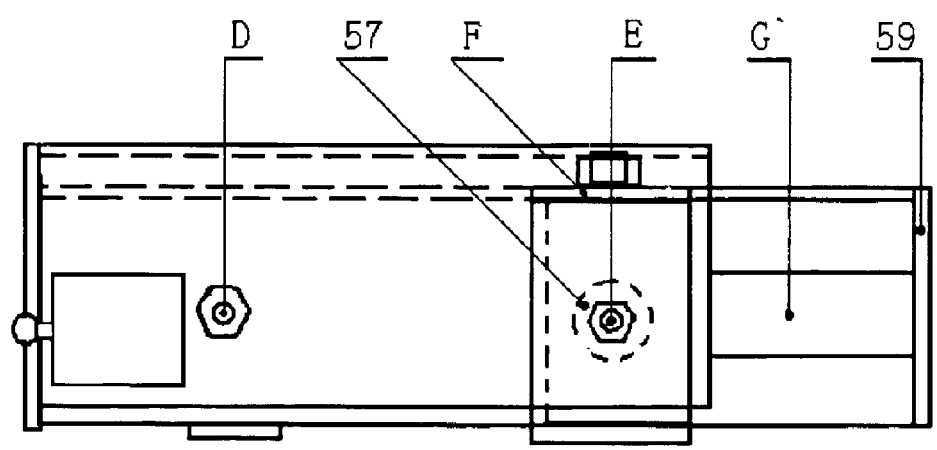
FIG. 14 is a side view of a second embodiment of the seat according to the invention.

The Second Embodiment:

As shown in FIG. 14, the fundamental structure of the second embodiment according to the present invention is similar to that of the first embodiment, so the same description is not repeated. The following are the differences between the two embodiments: A closing plate 59 is provided on the back part of the fixed frame in the second embodiment to prevent the back shaft from being away from the fixed frame. There is no middle shaft in the second embodiment. In addition, due to the fact that the energy-absorbing bearings 57, 58 (not shown) on the outside of the back shaft only have the function of energy-absorption, and the inner bearings 11, 11' are necessary to move backward during the accident, the outer diameters of the energy-absorbing bearings 57, 58 are not require to be larger that those of the inner bearings 11, 11'.

Figure 15:
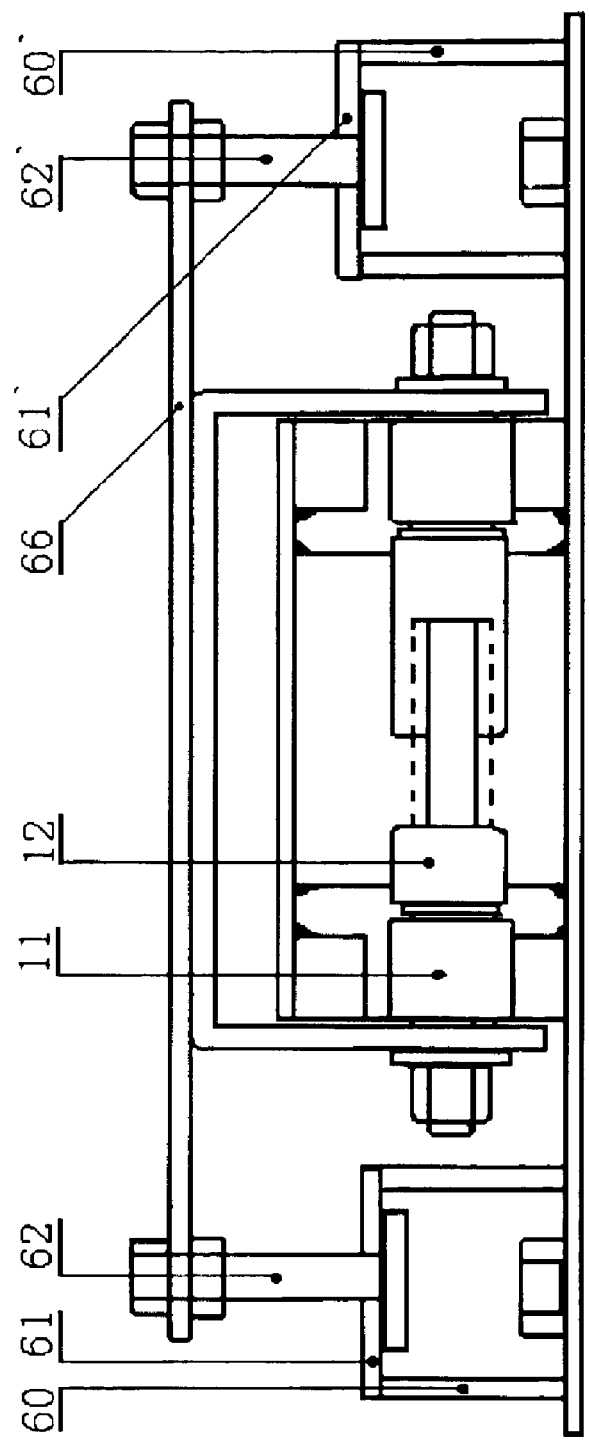
FIG. 15 is a view of a third embodiment of the seat, according to the invention with a closing plate removed from a back end of the fixed frame, seen from the back of the seat.
Figure 16:
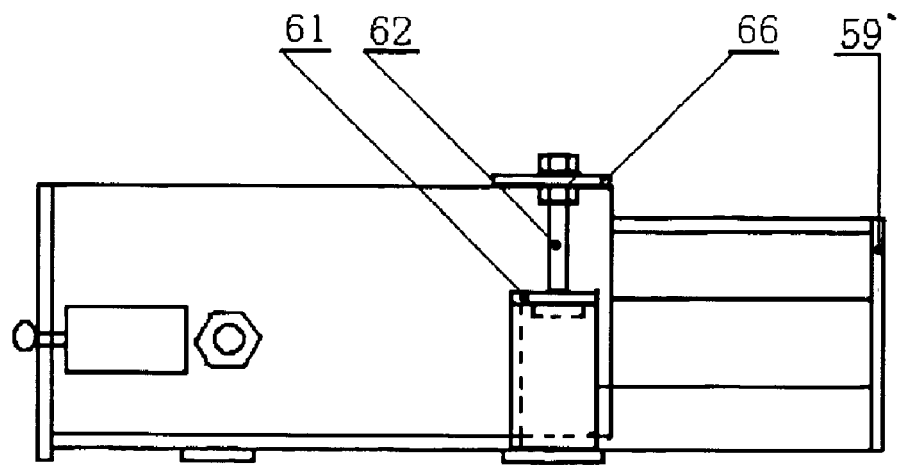
FIG. 16 is a view of the third embodiment of the seat, seen from the side of the seat.
Figure 17:
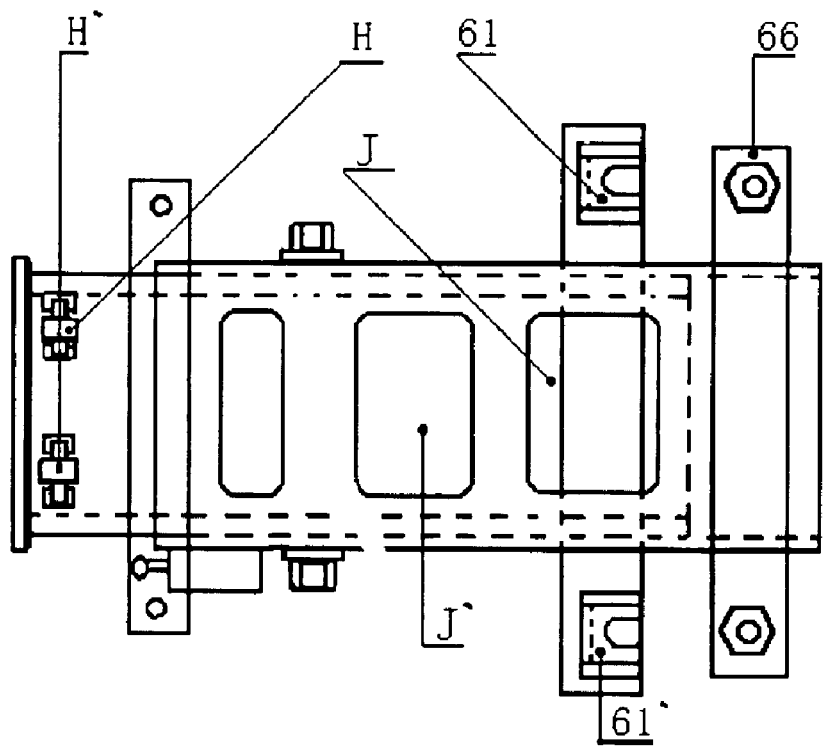
FIG. 17 is a top view of the third embodiment of the seat, in which the seat is displaced from its normal position.

The Third Embodiment:

As shown in FIGS. 15–17, the fundamental structure of the third embodiment according to the present invention is similar to that of the first embodiment, so the same description is not repeated. The following are the differences between the two embodiments: A closing plate 59' is provided on the back part of the fixed frame in the third embodiment to prevent the back shaft from moving away from the fixed frame. There is no middle shaft in the third embodiment. In addition, an energy-absorbing plate 66 positioned on the top surface of the movable bracket is provided on the back end of the movable bracket. The energy-absorbing plate 66 is connected to the back energy-absorbing racks 60, 60' on both sides of the fixed frame by energy-absorbing rods 62, 62' on both sides of the movable bracket. The hardness of the movable bracket B is considerably greater than that of the energy-absorbing plate 66. When the motor vehicle collides, a force inclined upward of the back part of the movable bracket is absorbed by the deformation (bent downward slightly) of the energy-absorbing plate, the energy-absorbing nails and the energy-absorbing rack. In a similar way, a part of the kinetic energy of the seat is also absorbed to separate the energy-absorbing rods 62, 62' from the cover plate 61, 61' of the back energy-absorbing rack 60, 60', respectively, so the outside energy-absorbing bearings 3, 3' of the back shaft in the first embodiment are not necessary. In this way, the main components are protected, including the bearings I, I' of the front shaft, the bearings 11, 11' of the back shaft, the moveable bracket B, rails G', G", the front shaft D and the back shaft E. As a result, the risk of the driver and/or the passenger being crushed can be avoided or reduced and the goal of rescuing the injured can be achieved.

Figure 18:
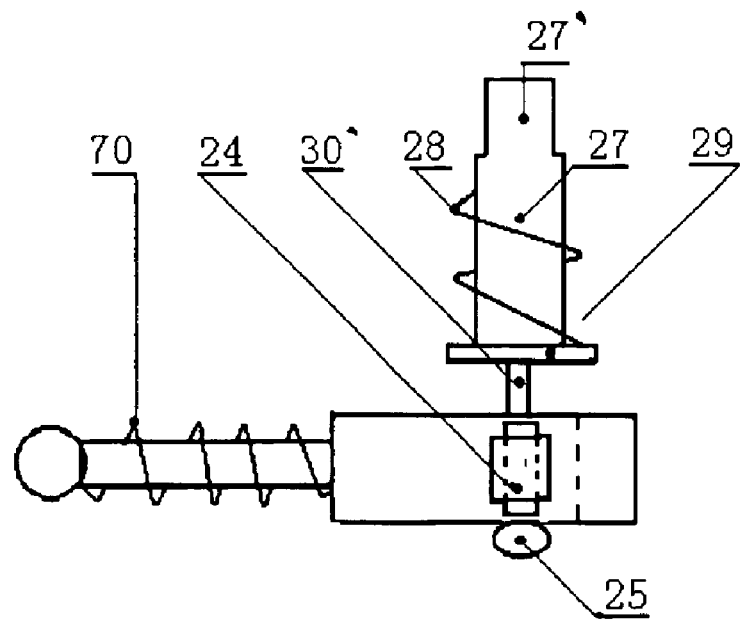
FIG. 18 is a top view of a control system of a fourth embodiment of the seat, according to the invention
Figure 19:
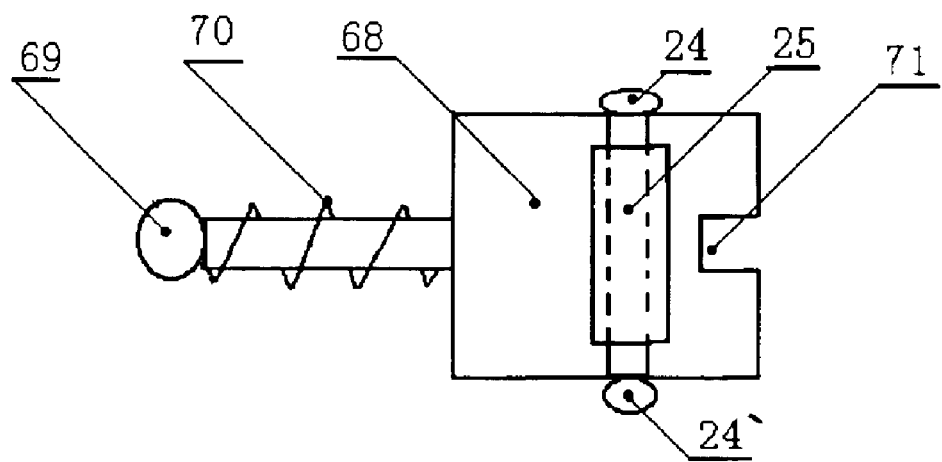
FIG. 19 is a side view of the control system of the fourth embodiment of the seat.

The Fourth Embodiment:

As shown in FIGS. 18 and 19, the fundamental structure of the fourth embodiment according to the present invention is similar to that of the first embodiment, so the same description is not repeated. The following are the differences between the two embodiments: The electromagnetic controller 21 is omitted from the seat control system C of the fourth embodiment; the weights of the metal block for controlling the lock pin and the manually operated control hammer are increased suitably; a spring 70 is provided additionally for resetting the metal block 68 with an increased weight to its original position; a handle of the manually operated control hammer after being sheathed with the spring 70 is directly connected to one end of the metal block 68 for controlling the lock pin move along the longitudinal direction; the other end of the metal block 68 has a notch 71 for the movement of the small end 30' of the lock pin along the longitudinal direction; and when mounted, the longitudinal direction of the metal block 68 with an increased weight that is integrally connected to the manually operated control hammer 69 is the same as the longitudinal direction (the direction of the front of the motor vehicle) of the motor vehicle and the end of the,metal block 68 that has a notch 71 for the movement of the small end 30' of the lock pin is directed to the rear of the motor vehicle. When the motor vehicle collides and the safety of the driver and/or passenger on the front seats is affected, even though there is no electromagnetic force, the lock pin 27 can also be moved out from the pin hole 20 in the side of the fixed frame G by the inertia of the metal block 68 with increased weight and of the manually operated control hammer 69, so that the seat is released. (This is adapted to a car running at a high speed.) The process that the lock pin 27 is moved out from the pin hole 20 in the side of the fixed frame G and the principle of making use of the inertia are the same as with the first embodiment. The goals of avoiding or reducing the driver and/or passenger from being crushed and for rescuing the injured conveniently are also achieved.

Those skilled in the art should understand clearly that all kinds of variations and modifications can be applied in the present invention without departing from the scope and spirit of the present invention. For example, the special shapes of various elements of the above-mentioned embodiments can be adjusted to adapt to particular applications. All the regulations and changes within the range of the claims and equivalents thereof are include in the present invention.

What is claimed is:

1. A mount for an anti-crash front safety seat for a motor vehicle having a cab for occupants, said safety seat comprising a seat and backrest, said mount comprising, in combination:

a fixed frame fixedly connected to a floor of the cab of the motor vehicle, said fixed frame having at least two elongate rails, the longitudinal direction of the rails of the fixed frame being the same as that of the motor vehicle;

a movable bracket supported movably on the rails of the fixed frame, said bracket being mounted below and adapted to be attached to the seat and backrest;

a front shaft and a back shaft passing through shaft holes in said bracket and positioned in the rails of the fixed frame;

a brake assembly, fixedly connected to at least one of the floor of the cab and said fixed frame, for applying a braking force to said back shaft to inhibit movement thereof; and a seat control system for locking said bracket to the fixed frame, so as to lock the seat and backrest in position during normal driving of the motor vehicle, and for releasing said bracket, and in turn the seat and backrest, for rearward movement in the event of a crash of the motor vehicle.

2. An anti-crash safety seat in a motor vehicle according to claim 1, wherein the seat control system further comprises: an electromagnetic controller whose axial orientation is same as the longitudinal direction of the motor vehicle, a manually operated control hammer and a metal block for controlling the pin lock, one end in the axial direction of a movable armature that is sheathed by a reset spring is connected to said manually operated control hammer, the other end in the axial direction thereof is connected to one end of the metal block, and the other end thereof has a notch, one big end of the lock pin inserted into said pin hole and metal sleeve is sheathed by a reset spring, and the other small end thereof has a flange for supporting the reset spring, wherein in the condition that the seat is locked, the small end of the lock pin is sustained against the metal block by the effects of a bearing and a housing wall of the control system, and wherein in the condition that the seat is released, the metal block moves along the longitudinal direction of the motor vehicle relative to the lock pin under the effect of the electromagnetic controller and the inertia of the manually operated control hammer and of the metal block are under the effect of the manually operated control hammer directly until the small end of the lock pin enters into the notch in the other end of the metal block, and at the time the lock pin is moved out of said pin hole by the reset spring.

3. An anti-crash safety seat in a motor vehicle according to claim 2, wherein a step is provided on a tip of a big end of the lock pin for preventing it from being jammed in said pin hole and the metal sleeve.

4. An anti-crash safety seat in a motor vehicle according to claim 2, wherein the metal sleeve positioned on the front side of the moveable bracket for mounting the lock pin is a combination of two coaxial steel pipes with different inner diameters, a maximum value of the length of a portion of the metal sleeve that is embedded in the front side of the moveable bracket is equal to the thickness of the side of the moveable bracket; the length of a portion of the metal sleeve that has a small diameter is larger than the thickness of the side of the moveable bracket, and a diameter of the portion is slightly larger than that of the lock pin, while it is smaller than that of the reset spring sheathing on the lock pin; the length of the portion of the metal sleeve that has a large diameter is smaller than that the of the portion having a small diameter; the diameter of the portion of the metal sleeve that has a big diameter is larger than the outer diameter of the reset spring sheathing on the lock pin, and the reset spring for the lock pin is provided in the portion of the metal sleeve that has a large diameter and abuts against the step wall locating the intersection of the portions.

5. An anti-crash safety seat in a motor vehicle according to claim 1, wherein said back shaft further comprises two outer energy-absorbing bearings disposed outside of the rails, the energy-absorbing device comprises energy-absorbing racks provided on both sides of the moveable bracket and energy-absorbing nails contacting with the top portion of the energy-absorbing bearings of the back shaft.

6. An anti-crash safe seat in a motor vehicle according to claim 5, wherein the outer energy-absorbing bearings of said back shaft are large bearings that endure high pressure, the energy-absorbing bearings are compression resistant, small roller bearings, having inner and outer rings, the width of the outer ring of the small roller bearings is wider than that of the conventional bearings, the length of the roller bearings is longer than that of the conventional bearing, the maximum value of the width of the outer ring of the roller bearings is 1.5 times of that of the conventional bearing, and the maximum value of the length of the outer ring of the roller bearings is 1.5 times of that of the conventional bearing.

7. An anti-crash safety seat in a motor vehicle according to claim 1, wherein a middle hole is further provided between the holes for the front shaft and holes for the back shaft on both sides of the moveable bracket, and a middle shaft with two bearings is disposed on the rails of the fixed frame by passing through said middle holes, in order to keep said front and middle shafts in the rails after the back shaft is moved out from the rails.

8. An anti-crash safety seat in a motor vehicle according to claim 1, wherein a closing plate is disposed on a rear end of the two rails in the fixed frame to prevent the back shaft from being moved out, off the rails.

9. An anti-crash safety seat in a motor vehicle according to claim 5, wherein the outer diameter of the outer energy-absorbing bearings of the back shaft is larger than that of the coaxial inner bearings.

10. An anti-crash safety seat in a motor vehicle according to claim 8, wherein the energy-absorbing device on the back part of the moveable bracket comprises energy-absorbing racks on both sides of the moveable bracket, one energy-absorbing plate positioned on the top surface of the back part of the moveable bracket and energy-absorbing nails for connecting the energy-absorbing plate to both sides of the energy-absorbing racks, and wherein the hardness of the moveable bracket is stronger than that of the energy-absorbing plate.

11. An anti-crash safety seat in a motor vehicle according to claim 1, wherein said lock pin has a substantially square shape, and the length of any one of its edges is longer than a maximum diameter of the lock pin.

12. An anti-crash safety seat in a motor vehicle according to claim 1, wherein the distance between the height of the two rails parallel each other in the moveable bracket and the diameter of the outer ring of the inner bearings for the front shaft and the inner bearings for the back shaft moving in the rails is larger than the normalized value that is required by normal mechanical movement, and wherein the maximum value of the distance is 10 mm.

13. An anti-crash safety seat in a motor vehicle according to claim 10, wherein the energy-absorbing racks comprise a thin channel section steel plate and cover plates fixed on one end of the steel plate, respectively, and the cover plates are connected to the energy-absorbing plate by the energy-absorbing rods, respectively.

14. An anti-crash safety seat in a motor vehicle according to claim 1, wherein the seat control system further comprises: a manually operated control hammer and a metal block for controlling the lock pin, a reset spring-sheathing the hammer for resetting the metal block to its original position, one end of said hammer is connected to one end of said metal block, the other end of the metal block has a notch, one big end of the lock pin inserted into said pin hole and metal sleeve is sheathed by a reset spring, and the other small end thereof has a flange for supporting the reset spring, wherein in the condition that the seat is locked, the small end of the lock pin is sustained by the metal block by the effects of a bearing and a housing wall of the control system, and wherein in the condition that the seat is released, the metal block moves along the longitudinal direction of the motor vehicle relative to the lock pin under the inertia effect of the manually operated control hammer and the metal block until the small end of the lock pin enters into the notch in the other end of the metal block, and at the time the lock pin is moved out from said pin hole by the reset spring.

15. An anti-crash safety seat in a motor vehicle according to claim 1, wherein said fixed frame includes a front energy-absorbing buffer band, an energy-absorbing plate provided on the top surface thereof, energy-absorbing bearings provided on the front end of the energy-absorbing plate, a pin hole provided in one front side of the fixed frame, two rails parallel each other formed in both back sides of the fixed frame, an iron plate for limiting the distance that the seat can move backwards and for reinforcing the fixed frame, and an energy-absorbing device provided on the back part of the fixed frame.

16. An anti-crash safety seat in a motor vehicle according to claim 15, wherein the top surface of the movable bracket is supported on the energy-absorbing bearings, a metal sleeve for positioning a lock pin is disposed on a front part on one side of the movable bracket in a position corresponding to said pin hole, and front and back shaft holes which are spaced with each other and are disposed on both sides of the movable bracket in positions corresponding to the two rails of the fixed frame.

17. An anti-crash safety seat in a motor vehicle according to claim 1, further comprising inner bearings of the front shaft disposed on the front shaft for contacting the upper surface of the rails, and inner bearings of the back shaft disposed on the back shaft supported by the lower surface of the rails.

18. An anti-crash safety seat in a motor vehicle according to claim 16, wherein said seat control system is provided on the front part on one side of the movable bracket corresponding to the metal sleeve, the control system locking the movable bracket having the backrest to the fixed frame by the lock pin passing through said metal sleeve and pin hole, so as to lock the seat and releasing the seat by taking said lock pin out of said pin hole.

19. An anti-crash safety seat in a motor vehicle according to claim 1, wherein the brake assembly is mechanically adjustable to vary the force applied to the back shaft to inhibit movement thereof.

20. An anti-crash safety seat in a motor vehicle according to claim 1, wherein the back shaft is rotatable, and wherein the brake assembly comprises energy-absorbing bearings mounted on opposite ends of the back shaft for rotation therewith and brake rods for applying a braking force against said energy-absorbing bearings.

* * * * *